United States Patent
Yang et al.

(10) Patent No.: US 12,483,292 B2
(45) Date of Patent: Nov. 25, 2025

(54) TRANSMITTER AND RECEIVER, AND RADIO AUDIO SYSTEM HAVING SAME

(71) Applicant: LG ELECTRONICS INC., Seoul (KR)

(72) Inventors: Jisung Yang, Seoul (KR); Joonseok Maeng, Seoul (KR); Seunghyun Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/709,425

(22) PCT Filed: Dec. 24, 2021

(86) PCT No.: PCT/KR2021/019865
§ 371 (c)(1),
(2) Date: May 10, 2024

(87) PCT Pub. No.: WO2023/120789
PCT Pub. Date: Jun. 29, 2023

(65) Prior Publication Data
US 2025/0030452 A1    Jan. 23, 2025

(51) Int. Cl.
*H04B 1/7183*    (2011.01)
(52) U.S. Cl.
CPC ................. *H04B 1/7183* (2013.01)
(58) Field of Classification Search
CPC ...................................... H04B 1/7183
See application file for complete search history.

(56) References Cited

U.S. PATENT DOCUMENTS

2010/0003929 A1    1/2010  Sohn et al.
2017/0127410 A1*   5/2017  Ylamurto ................ H04W 4/06

FOREIGN PATENT DOCUMENTS

| KR | 100714453 | 5/2007 |
| KR | 1020090038978 | 4/2009 |
| KR | 101562782 | 10/2015 |
| WO | 2008007891 | 1/2008 |

OTHER PUBLICATIONS

PCT International Application No. PCT/KR2021/019865 International Search Report dated Sep. 16, 2022, 2 pages.

\* cited by examiner

*Primary Examiner* — Rahel Guarino
(74) *Attorney, Agent, or Firm* — LEE, HONG, DEGERMAN, KANG & WAIMEY

(57) ABSTRACT

The present disclosure provides a radio audio system which is not affected by radio traffic congestion such as a Wi-Fi traffic increase. The transmitter may comprise: a communicator for transmitting audio data to at least one receiver by means of an ultra-wide band (UWB); and a controller for allocating a guaranteed timeslot (GTS) of the receiver in accordance with the channel information of the receiver, and transmitting the audio data to the allocated GTS, if a GTS request is received from the receiver.

15 Claims, 8 Drawing Sheets

FIG. 9
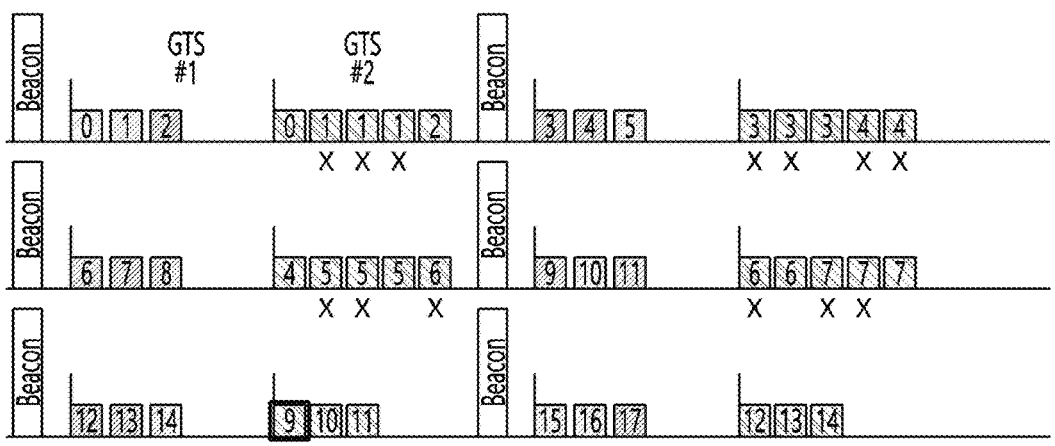
Since effective data period has exceeded, transmission of audio data #8 is cancelled and audio data #9 and subsequent audio data are transmitted.
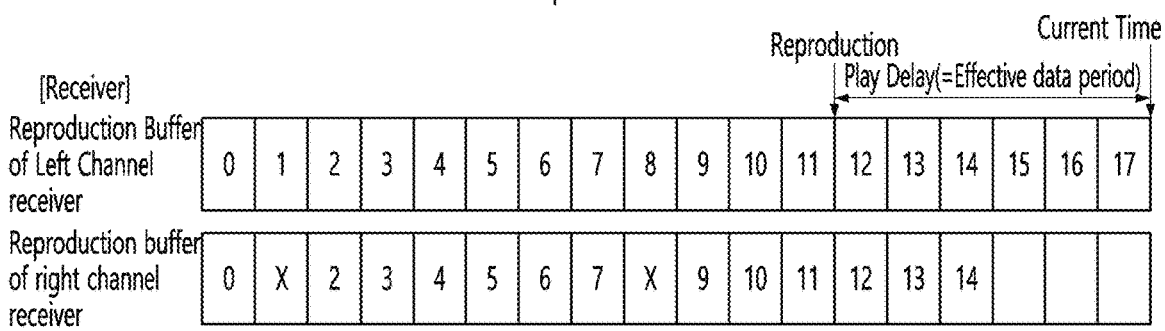

TRANSMITTER AND RECEIVER, AND RADIO AUDIO SYSTEM HAVING SAME

CROSS-REFERENCE TO RELATED APPLICATION(S)

This application is the National Stage filing under 35 U.S.C. 371 of International Application No. PCT/KR2021/019865, filed on Dec. 24, 2021, the contents of which are all incorporated by reference herein in its entirety.

TECHNICAL FIELD

The present disclosure relates to a transmitter and a receiver, and a radio audio system having the same.

BACKGROUND ART

Due to the increase in the number of devices using a 2.4 GHz frequency band, such as Wi-Fi routers, smartphones, Bluetooth headsets, and wireless speakers, the frequency of traffic congestion is increasing. Accordingly, audio quality degradation problems such as sound interruption/distortion are occurring in radio audio products.

Therefore, there is a need for a radio audio system that can ensure audio quality even in an environment where a plurality of wireless devices are used.

DISCLOSURE OF INVENTION

Technical Problem

The present disclosure provides a radio audio system which is not affected by radio congestion such as Wi-Fi traffic increase.

The present disclosure provides a radio audio system with improved audio quality.

The present disclosure provides a radio audio system which may stably secure audio quality during the transmission of multi-channel audio data using ultra-wide band (UWB) wireless technology.

Technical Solution

An embodiment of the present disclosure provides a radio audio system using ultra-wide band wireless (UWB) technology, which has low frequency congestion and is resistant to interference.

A radio audio system according to an embodiment of the present disclosure provides a method for performing multi-channel audio data transmission and time synchronization when UWB wireless technology is applied.

A transmitter of a radio audio system according to an embodiment of the present disclosure may include a communicator configured to transmit audio data to at least one receiver via ultra-wide band (UWB), and a controller configured to, when receiving a guaranteed timeslot (GTS) request from the receiver, allocate a GTS of the receiver according to channel information of the receiver and transmit the audio data to the allocated GTS.

After allocating the GTS, the controller may be configured to transmit, to the receiver, data transmission-related information including the number of data to be transmitted during a beacon interval section and an effective data transmission period.

The controller may include, in a header of the audio data, a beacon sequence number of the beacon interval section in which the audio data is transmitted.

The controller may be configured to, when failing to transmit the audio data, determine whether the audio data whose transmission is failed has exceeded an effective transmission period, and cancel audio data transmission when the effective transmission period has exceeded.

A receiver according to an embodiment of the present disclosure may include a communicator configured to receive audio data from a transmitter via ultra-wide band (UWB), and a controller configured to request the transmitter to allocate a guaranteed timeslot (GTS) for receiving the audio data and receive the audio data through the allocated GTS.

The controller may be configured to reproduce audio data whose beacon sequence number is a value obtained by subtracting an effective data transmission period from a current beacon sequence number.

The controller may be configured to operate in an awake state or a sleep state depending on information indicating a presence or absence of transmission data included in a beacon header.

A radio audio system according to an embodiment of the present disclosure may include a transmitter configured to transmit audio data via ultra-wide band (UWB), and a receiver configured to receive the audio data from the transmitter, wherein the transmitter is configured to, when receiving a guaranteed timeslot (GTS) request from the receiver, allocate a GTS of the receiver according to channel information of the receiver and transmit the audio data to the allocated GTS.

After allocating the GTS, the transmitter may be configured to transmit, to the receiver, data transmission-related information including the number of data to be transmitted during a beacon interval section and an effective data transmission period.

The transmitter may include, in a header of the audio data, a beacon sequence number of the beacon interval section in which the audio data is transmitted.

The receiver may be configured to reproduce audio data whose beacon sequence number is a value obtained by subtracting an effective data transmission period from a current beacon sequence number.

The transmitter may be configured to, when failing to transmit the audio data, determine whether the audio data whose transmission is failed has exceeded an effective transmission period, and cancel audio data transmission when the effective transmission period has exceeded.

The transmitter may include information indicating a presence or absence of transmission data in a beacon header depending on a presence or absence of data to be transmitted to the GTS.

The receiver may be configured to operate in an awake state or a sleep state depending on the information indicating the presence or absence of transmission data included in the beacon header.

The receiver may be configured to switch to the awake state at the time of receiving a next beacon when the receiver is operating in the sleep state.

Advantageous Effects

According to an embodiment of the present disclosure, audio data is stably transmitted from a transmitter to a receiver, regardless of a Wi-Fi traffic increase, and thus, there is an advantage in that the occurrence of sound interruption is minimized.

According to an embodiment of the present disclosure, since audio data is transmitted through ultra-wide band (UWB) wireless technology, there is an advantage in that audio quality is enhanced compared to audio data transmission through Bluetooth (BT).

BRIEF DESCRIPTION OF DRAWINGS

FIG. 9 is a diagram showing a case where audio data is transmitted and received and is stored in a reproduction buffer in a radio audio system according to an embodiment of the present disclosure.

BEST MODE FOR CARRYING OUT THE INVENTION

Hereinafter, embodiments relating to the present disclosure will be described in detail with reference to the drawings. The suffixes "module" or "unit" for components used in the description below are assigned or mixed in consideration of easiness in writing the specification and do not have distinctive meanings or roles by themselves.

It will be understood that although the terms "first," "second," etc. may be used herein to describe various elements, these elements should not be limited by these terms. These terms are only used to distinguish one element from another.

The present disclosure provides a radio audio system to which ultra-wide band (UWB) wireless technology is applied. The UWB technology may be IEEE 802.15.4/4z, but this is only an example and the present disclosure is not limited thereto.

The present disclosure provides a method for performing multi-channel audio data transmission and time synchronization in a radio audio system to which UWB wireless technology is applied.

Figure 1:
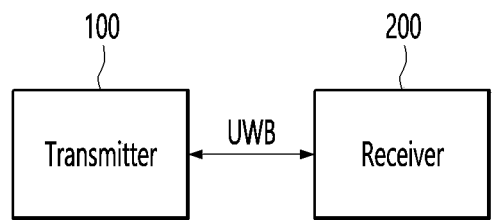
FIG. 1 is a schematic diagram showing a structure of a radio audio system according to an embodiment of the present disclosure.

FIG. 1 is a schematic diagram showing a structure of a radio audio system according to an embodiment of the present disclosure.

According to an embodiment of the present disclosure, the radio audio system may include a transmitter 100 and a receiver 200, and the transmitter 100 and the receiver 200 may perform communication through UWB wireless technology.

The transmitter 100 may be a device that transmits audio data, and the receiver 200 may be a device that receives audio data.

In the case of FIG. 1, the transmitter 100 may directly receive audio data from the outside or transmit, to the receiver 200, audio data corresponding to a sound source stored therein. For example, the transmitter 100 may be a smartphone, a tablet PC, a laptop, a computer, a TV, etc., and the receiver 200 may be an earbud, an earphone, a wireless speaker, etc., but this is only an example.

Meanwhile, according to another embodiment, the transmitter 100 may receive a sound source from the outside and transmit, to the receiver 200, audio data corresponding to the provided sound source.

Figure 2:
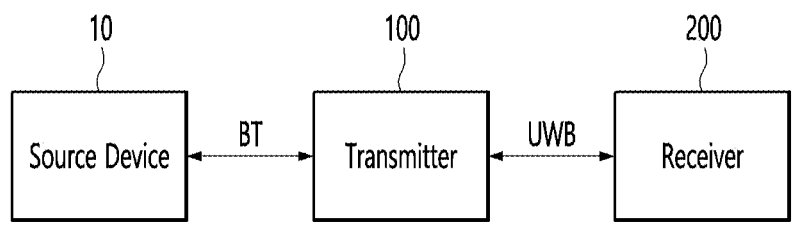
FIG. 2 is a schematic diagram showing a structure of a radio audio system according to another embodiment of the present disclosure.

FIG. 2 is a schematic diagram showing a structure of a radio audio system according to another embodiment of the present disclosure.

According to another embodiment of the present disclosure, a radio audio system may include a source device 10, a transmitter 100, and a receiver 200.

The source device 10 may directly receive a sound source from the outside, may store a sound source therein, and may transmit the sound source to the transmitter 100.

For example, the transmitter 100 may be in the form of a dongle and may be mounted on the source device 10 to receive a sound source from the source device 10. As another example, the transmitter 100 may be mounted inside the source device 10 to receive a sound source from the source device 10 by wire (or wirelessly). That is, in the example of FIG. 2, the source device 10 and the transmitter 100 are shown as transmitting and receiving the sound source through Bluetooth BT, but this is only an example for convenience of explanation and the present disclosure is not limited thereto.

In summary, in the case of FIG. 2, the transmitter 100 may receive, from the source device 10, the sound source or audio data corresponding to the sound source, and transmit, to the receiver 200, the sound source or audio data corresponding to the sound source. For example, the source device 10 may be a smartphone, a tablet PC, a laptop, a computer, a TV, etc., the transmitter 100 may be a cradle, and the receiver 200 may be an earbud, an earphone, a wireless speaker, etc., but this is only an example.

Figure 3:
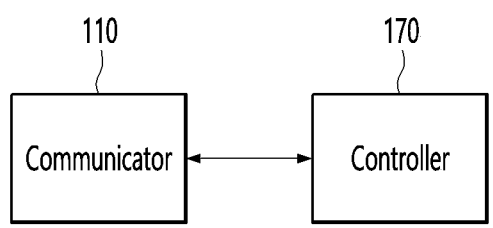
FIG. 3 is a control block diagram of a transmitter according to an embodiment of the present disclosure.
Figure 4:
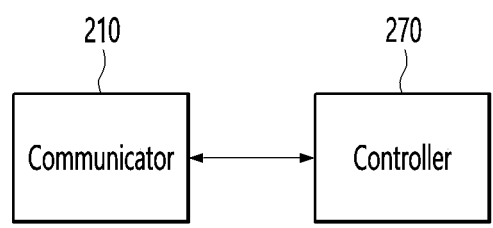
FIG. 4 is a control block diagram of a receiver according to an embodiment of the present disclosure.

FIG. 3 is a control block diagram of the transmitter according to an embodiment of the present disclosure, and FIG. 4 is a control block diagram of the receiver according to an embodiment of the present disclosure.

Referring to FIG. 3, the transmitter 100 may include a communicator 110 and a controller 170.

The communicator 110 may communicate with an external device such as the receiver 200 or the source device 10. The communicator 110 may transmit audio data to at least one receiver 200 through UWB. In addition, the communicator 110 may transmit data transmission-related information, etc. to the receiver 200.

The controller 170 may be responsible for the operation of the transmitter 100. The controller 170 may control the communicator 110. The controller 170 may set various conditions such as guaranteed timeslot (GTS) allocation, setting of the number of audio frames to be transmitted for each beacon interval section, setting of the effective data transmission period, and setting of the number of retransmissions. In addition, the controller 170 may perform operations such as beacon transmission, audio data transmission, determination as to whether audio data is transmitted, and determination as to whether the effective transmission period of audio data has exceeded.

Referring to FIG. 4, the receiver 200 may include a communicator 210 and a controller 270.

The communicator 210 may communicate with the transmitter 100. The communicator 210 may receive audio data from the transmitter 100 through UWB. In addition, the communicator 210 may request a transmitter 100 for a GTS and transmit channel information to the transmitter 100.

The controller 270 may be responsible for the operation of the receiver 200. The controller 270 may control the communicator 210. The controller 270 may perform various operations such as determination as to whether GTS allocation is complete, determination as to whether data transmission-related information is received, and reproduction of audio data.

Meanwhile, the configurations shown in FIGS. 3 and 4 are only examples for convenience of explanation, and configurations other than those described above may be further included or omitted.

The radio audio system according to various embodiments of the present disclosure may allocate dedicated transmission and reception sections to the receivers and transmit and receive audio data through the allocated sections. Next, a method for transmitting and receiving audio data between the transmitter 100 and the receiver 200 in the radio audio system will be described in detail with reference to FIGS. 5 to 9.

Figure 5:
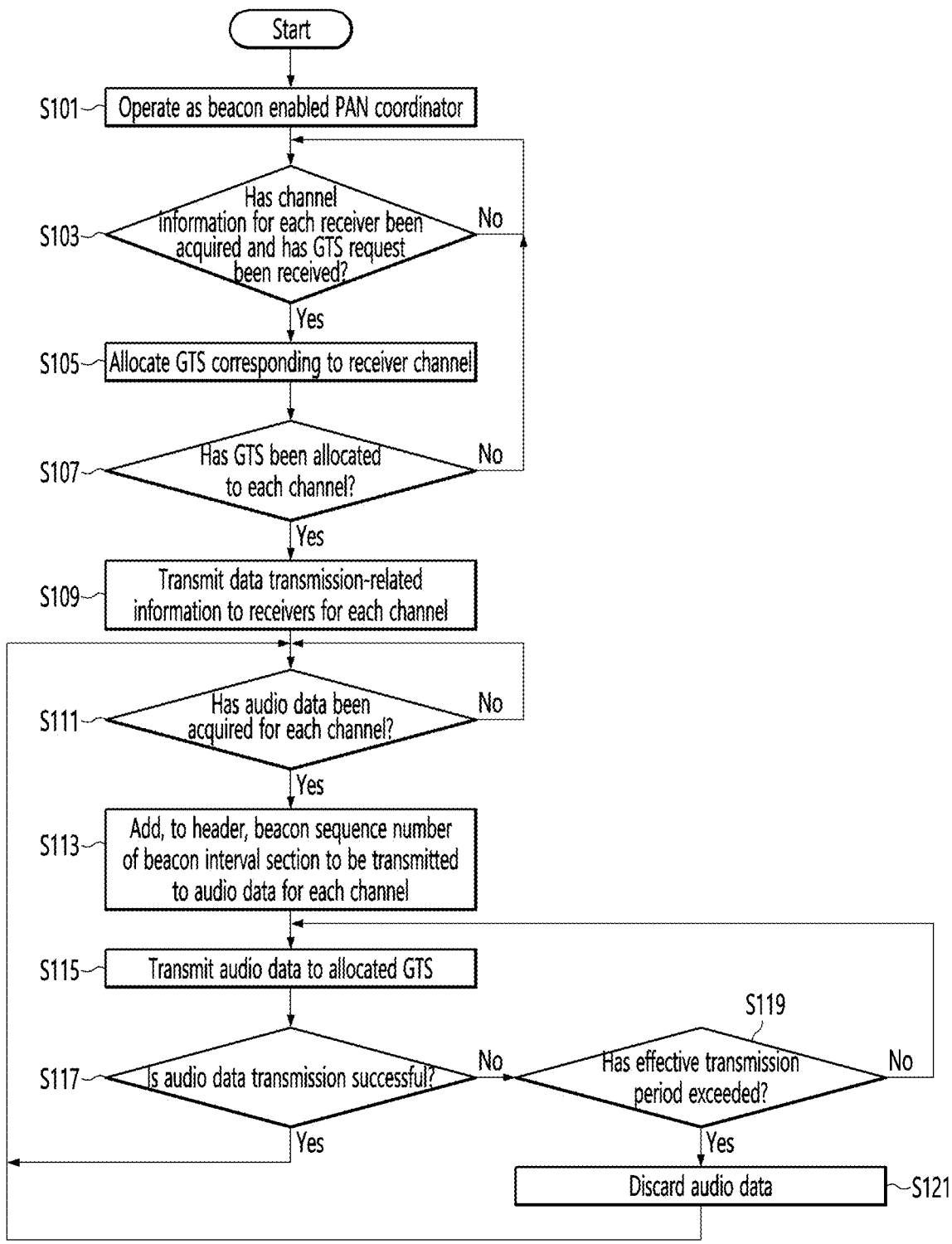
FIG. 5 is a flowchart showing an operating method of a transmitter according to an embodiment of the present disclosure.

FIG. 5 is a flowchart showing the operating method of the transmitter according to an embodiment of the present disclosure.

The transmitter 100 may operate as a beacon enabled PAN coordinator (S101).

The transmitter 100 may operate as a beacon enabled PAN coordinator or a non-beacon enable PAN coordinator. The transmitter 100 may operate as a beacon enabled PAN coordinator when transmitting radio audio through UWB.

The beacon enabled PAN coordinator indicates an operation mode that transmits beacons at a superframe period.

The transmitter 100 may acquire channel information for each receiver and determine whether a GTS request has been received (S103).

The channel information for each receiver may refer to audio channel information handled by each receiver.

The GTS refers to a transmission/reception section exclusively used by a specific device. The GTS may be a guaranteed time slot described in IEEE 802.15.4. The GTS may be a transmission/reception section exclusively used by each receiver. The receiver 200 may connect to the transmitter 100 and request the transmitter 100 for the GTS.

The transmitter 100 may receive channel information for each receiver from the receiver 200 or through an input unit (not shown) provided therein. Alternatively, the transmitter 100 may receive channel information for each receiver from the source device 10.

When the transmitter 100 fails to acquire channel information for each receiver or does not receive a GTS request, the transmitter 100 may continue to acquire channel information for each receiver and determine whether a GTS request has been received.

The transmitter 100 may acquire channel information for each receiver. When the transmitter 100 receives the GTS request, the transmitter 100 may allocate a GTS corresponding to the receiver channel (S105).

The transmitter 100 may allocate each of at least one receiver the GTS corresponding to the receiver channel. The transmitter 100 may perform the role of the receiver, that is, may identify the audio channel of the receiver, and may allocate the GTS accordingly. Table 1 below is a table showing an example of GTS allocation for each receiver in a 5.1-channel radio audio system.

TABLE 1

|  | Role (audio channel) | GTS # |
|---|---|---|
| Receiver #1 | Front Left | 1 |
| Receiver #2 | Front Right | 2 |
| Receiver #3 | Rear Left | 3 |
| Receiver #4 | Rear Right | 4 |
| Receiver #5 | Center | 5 |
| Receiver #6 | Woofer | 6 |

As shown in Table 1, the transmitter 100 may allocate GTS #1 to the first receiver whose audio channel is Front Left, may allocate GTS #2 to the second receiver whose audio channel is Front Right, may allocate GTS #3 to the third receiver whose audio channel is Rear Left, may allocate GTS #4 to the fourth receiver whose audio channel is Rear Right, may allocate GTS #5 to the fifth receiver whose audio channel is Center, and may allocate GTS #6 to the sixth receiver whose audio channel is Woofer.

Figure 6:
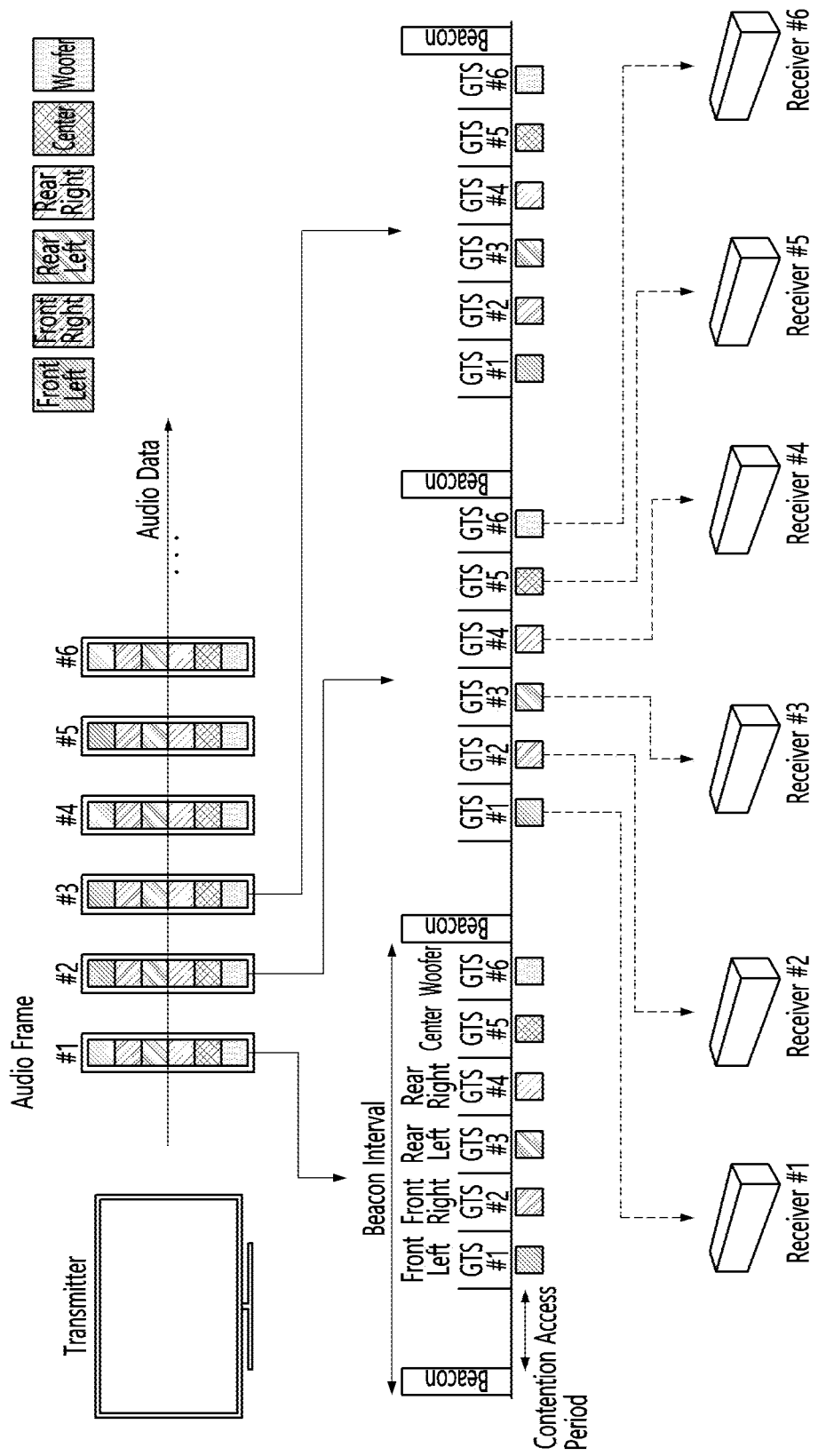
FIG. 6 is a schematic diagram of data transmission for each audio channel in a radio audio system according to an embodiment of the present disclosure.

FIG. 6 is a schematic diagram of data transmission for each audio channel in a radio audio system according to an embodiment of the present disclosure.

Audio data may include a plurality of audio frames, and each of the audio frames may include audio data for each of a plurality of channels.

The transmitter 100 may transmit audio data for each of the plurality of channels to the GTS allocated to each beacon interval.

Meanwhile, since Table 1 and FIG. 6 are only examples for explanation, it is obvious that the present disclosure is not limited thereto.

That is, the transmitter 100 may generate a transmission section for each audio channel at a beacon interval period, and the transmission section may be a GTS.

Meanwhile, the maximum number of GTSs generated in one beacon interval period may be 7. Accordingly, when there are more than eight audio channels, the transmitter 100 may transmit seven channels through GTS and the remaining channels through a contention access period.

The transmitter 100 may determine whether GTS allocation for each channel has been completed (S107).

When GTS allocation for each channel has not been completed, the transmitter 100 may continue to acquire channel information for each receiver, determine whether the GTS request has been received, and allocate the GTS corresponding to the receiver channel.

When GTS allocation for each channel has been completed, the transmitter 100 may transmit data transmission-related information to receivers for each channel (S109).

The data transmission-related information may include the number of data transmitted in a BI section and an effective data transmission period.

The number of data transmitted in the BI section refers to the number of audio data to be transmitted in each beacon interval section.

The effective data transmission period refers to the maximum number of beacon intervals for which transmission is retried from the beacon interval scheduled for transmission when audio data transmission fails.

The transmitter 100 may determine whether audio data has been acquired for each channel (S111).

When the transmitter 100 fails to acquire audio data for each channel of the sound source to be reproduced, the transmitter 100 may determine whether to continuously acquire audio data for each channel.

When the transmitter 100 acquires audio data for each channel, the transmitter 100 may add, to a header, a beacon sequence number of a beacon interval section to be transmitted to the audio data for each channel (S113).

The beacon sequence number of the beacon may be added to the audio data transmitted in the GTS section. The transmitter 100 may include the beacon sequence number of the beacon transmitted at the start of the beacon interval section in the audio data transmitted during the beacon interval section for time synchronization between receivers when reproducing audio.

Figure 7:
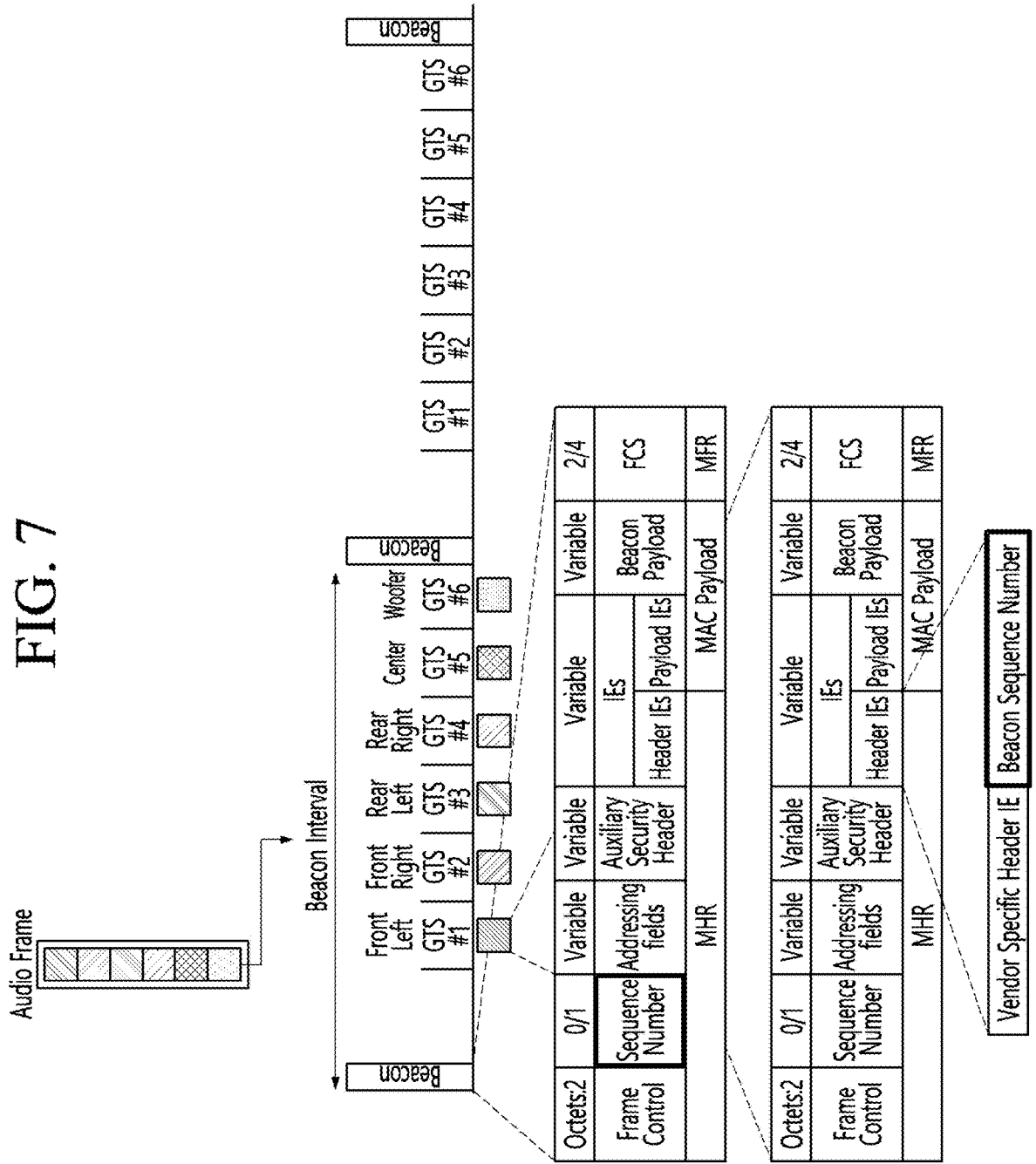
FIG. 7 is a diagram showing a case where a transmitter inserts a beacon sequence number into a beacon and audio data in a radio audio system according to an embodiment of the present disclosure.

FIG. 7 is a diagram showing a case where the transmitter inserts the beacon sequence number into the beacon and audio data in the radio audio system according to an embodiment of the present disclosure.

Referring to FIG. 7, the transmitter 100 may transmit beacons at the start of the beacon interval section, and each of the beacons may include the beacon sequence number. The transmitter 100 may include the beacon sequence number of the beacon transmitted at the start of the beacon interval section in header IEs of audio data transmitted during the beacon interval section. At this time, the header IEs may be defined by using vendor-specific header IE.

FIG. 5 is described again.

The transmitter 100 may transmit the audio data to the allocated GTS (S115).

The transmitter 100 may transmit a certain number of audio data for each beacon interval in the GTS section allocated to each receiver 200. At this time, the audio data transmitted to the GTS may be data for each audio channel separated from the audio frame or an audio frame including all channel data, depending on system performance.

The transmitter 100 may determine whether audio data transmission has been successful (S117).

When the transmitter 100 succeeds in transmitting the audio data, the transmitter 100 may determine whether to acquire next audio data for each channel.

When the transmitter 100 fails to transmit the audio data, the transmitter 100 may acquire whether the effective transmission period has exceeded (S119).

When the transmission of the audio data has not been successful, the transmitter 100 may determine whether the effective transmission period has exceeded. When the transmitter 100 fails to transmit the audio data fails, the transmitter 100 may determine whether the effective transmission period of the failed audio data has exceeded.

When the effective transmission period has not exceeded, the transmitter 100 may retransmit the failed audio data to the receiver 200. When the effective transmission period has not exceeded, the transmitter 100 may transmit the failed audio data to the allocated GTS. Upon retransmission, the transmitter 100 may perform an IEEE 802.15.4 retransmission process within the GTS section. That is, the transmitter 100 may use an IEEE 802.15.4 retransmission algorithm when retransmitting the audio data.

The transmitter 100 may discard the audio data when the effective transmission period has exceeded (S121).

When the effective transmission period has exceeded, the transmitter 100 may cancel the transmission of the audio data.

After discarding the audio data, the transmitter 100 may determine whether to acquire next audio data for each channel.

Figure 8:
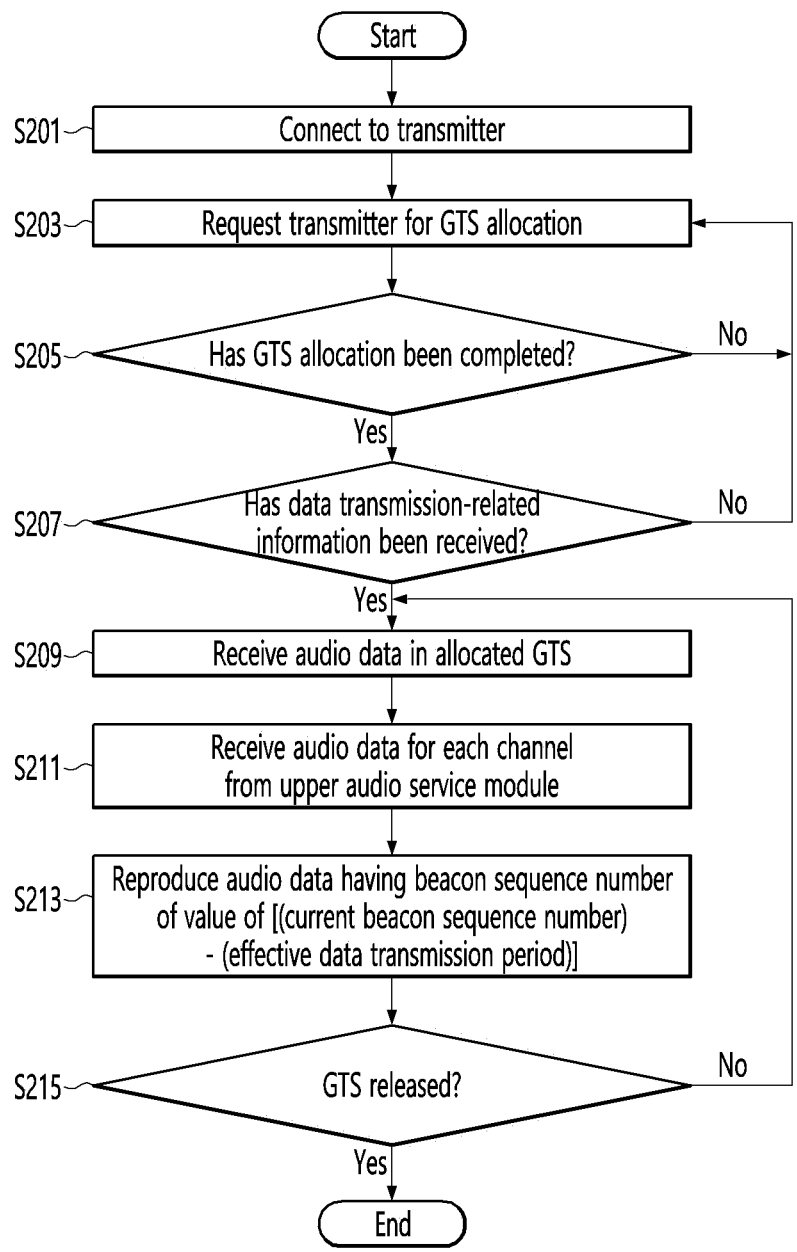
FIG. 8 is a flowchart showing an operating method of a receiver according to an embodiment of the present disclosure.

Next, FIG. 8 is a flowchart showing the operating method of the receiver according to an embodiment of the present disclosure.

The receiver 200 may be connected to the transmitter 100 (S201).

The receiver 200 may request the transmitter 100 for GTS allocation (S203).

The receiver 200 may transmit a GTS allocation request signal to the transmitter 100.

The receiver 200 may determine whether GTS allocation has been completed (S205).

The receiver 200 may acquire whether GTS allocation has been complete. When GTS allocation has not been completed, the receiver 200 may request the transmitter 100 for GTS allocation.

When GTS allocation has been completed, the receiver 200 may determine whether data transmission-related information has been received (S207).

When GTS allocation has been completed, the receiver 200 may acquire whether data transmission-related information has been received. Since the data transmission-related information is the same as described in S109 of FIG. 5, redundant descriptions thereof is omitted.

When the receiver 200 has not received the data transmission-related information, the receiver 200 may request the transmitter 100 for GTS allocation again.

When the receiver 200 has received the data transmission-related information, the receiver 200 may receive audio data in the allocated GTS (S209).

The receiver 200 may receive audio data for each channel from an upper audio service module (S211).

Here, the upper audio service module may refer to a service module that provides sound sources.

The receiver 200 may reproduce audio data having a beacon sequence number of a value of [(current beacon sequence number)−(effective data transmission period)] (S213).

The receiver 200 may use the beacon sequence number to determine a reproduction timing. That is, when there are a plurality of receivers 200, the beacon sequence number may be used for reproduction synchronization of the plurality of receivers 200.

For example, the receiver 200 may reproduce audio data before the effective data transmission period based on the beacon reception time, thereby achieving time synchronization with other receivers. That is, the receiver 200 may reproduce audio data whose beacon sequence number is the value obtained by subtracting the effective data transmission period from the current beacon sequence number.

FIG. 9 is a diagram showing a case where audio data is transmitted and received and is stored in a reproduction buffer in a radio audio system according to an embodiment of the present disclosure.

FIG. 9 illustrates an example of a process in which receivers receive data and store the received data in a reproduction buffer in a radio audio system including two audio channels. At this time, it is assumed that there are three audio frames to be transmitted for each beacon interval section, an effective data transmission period is 2 (beacon interval), UWB retransmission is 2 (times) and the maximum number of transmission data in a GTS section is 5.

Hereinafter, a case where the transmitter 100 transmits audio frames of two channels (Left and Right) from #0 to #17 to the receiver 200 is described.

The transmitter 100 transmitted audio data #0 to #2 of the Left channel in GTS #1 during the first beacon interval section, and retransmitted audio data #1 of the Right channel in GTS #2 up to two times, but after transmission failure, the transmitter 100 transmitted audio data #2.

The transmitter 100 transmitted audio data #3 to #5 of the Left channel in GTS #1 during the second beacon interval section, and the transmitter 100 successfully transmitted audio data #3 of the Right channel in GTS #2 through the second retransmission and failed to transmit audio data #4 after one retransmission.

The transmitter 100 transmitted audio data #6 to #8 of the Left channel in GTS #1 during the third beacon interval section. Since the effective transmission period of audio data #4 still remained, the transmitter 100 successfully transmitted audio data #4 of the Right channel in GTS #2, successfully transmitted audio data #5 through the second retransmission, and failed to transmit audio data #6 after one retransmission.

The transmitter 100 transmitted audio data #9 to #11 of the Left channel in GTS #1 during the fourth beacon interval section and successfully transmitted audio data #6 and #7 of the Right channel in GTS #2 through the second retransmission.

The transmitter 100 transmitted audio data #12 to #14 of the Left channel in GTS #1 during the fifth beacon interval section. Meanwhile, because the effective transmission period of audio data #8 of the Right channel has expired in the fourth beacon interval section, the transmitter 100 canceled the transmission and transmitted audio data #9 to #11.

The transmitter 100 transmitted audio data #15 to #17 of the Left channel in GTS #1 and transmitted audio data #12 and #14 of the Right channel during the sixth beacon interval section.

The receivers 200 may reproduce audio frames that are prior to the effective transmission period of the audio data compared to the current time. The effective transmission period of the audio data may be the same time as a delay that occurs for buffering of audio data.

FIG. 8 is described again.

The receiver 200 may determine whether the GTS has been released (S215).

That is, the receiver 200 may determine whether GTS allocation has been released. When the GTS has not been released, the receiver 200 may receive audio data in the allocated GTS. The receiver 200 may end the operation when the GTS is released.

Meanwhile, according to an embodiment of the present disclosure, in order to improve standby power, the radio audio system may include information indicating the presence or absence of transmission data in the beacon when transmitting audio data.

Figure 10:
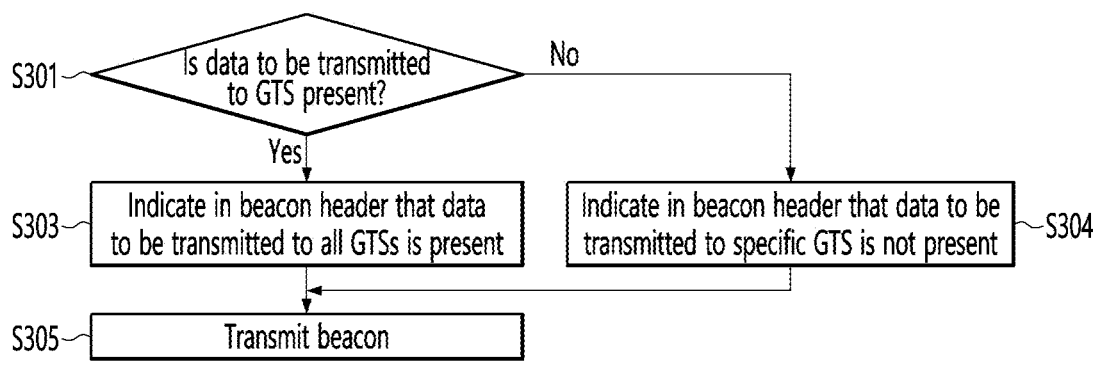
FIG. 10 is a flowchart showing a method by which a transmitter of a radio audio system according to an embodiment of the present disclosure includes information indicating the presence or absence of transmission data in a beacon.
Figure 11:
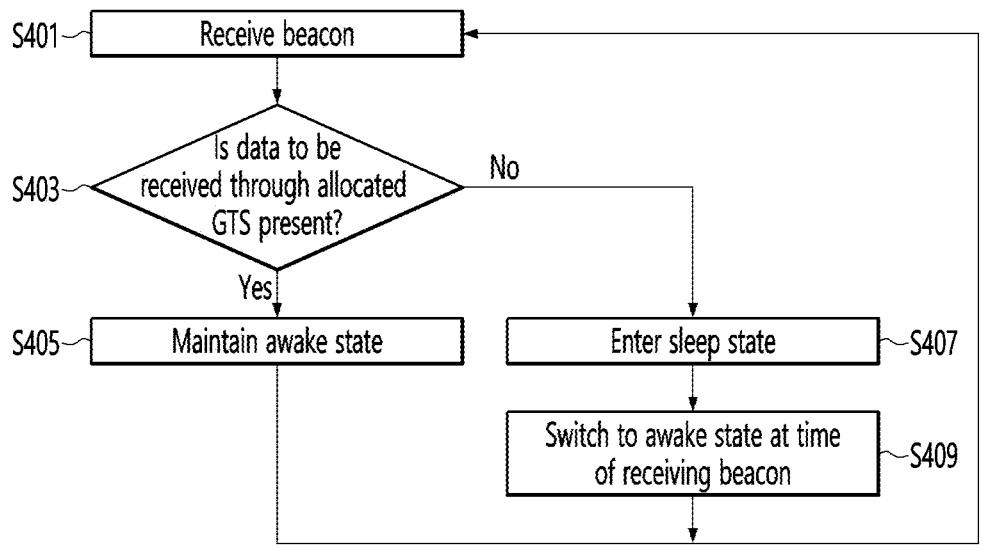
FIG. 11 is a flowchart showing a method by which a receiver of a radio audio system according to an embodiment of the present disclosure operates according to information included in a beacon.

FIG. 10 is a flowchart showing a method by which the transmitter of the radio audio system according to an embodiment of the present disclosure includes information indicating the presence or absence of transmission data in the beacon, and FIG. 11 is a flowchart showing a method by which the receiver of the radio audio system according to an embodiment of the present disclosure operates according to information included in the beacon.

Referring to FIG. 10, the transmitter 100 may determine whether data to be transmitted to the GTS is present (S301).

When the data to be transmitted to the GTS is present, the transmitter 100 may indicate in the beacon header that the data to be transmitted to all GTSs is present (S303).

When the data to be transmitted to the GTS is not present, the transmitter 100 may indicate in the beacon header that the data to be transmitted to a specific GTS is not present (S304).

The transmitter 100 may transmit, to the receiver 200, the beacon indicating the presence or absence of transmission data (S305).

Referring to FIG. 11, the receiver 200 may receive the beacon transmitted by the transmitter 100 (S401).

The receiver 200 may determine whether data to be received through the allocated GTS is present (S403).

The receiver 200 may determine the presence or absence of data to be received through the allocated GTS based on the information included in the beacon.

When it is determined that the data to be received through the allocated GTS is present, the receiver 200 may maintain an awake state (S405).

When it is determined that the data to be received through the allocated GTS is not present, the receiver 200 may enter a sleep state (S407).

The receiver 200 may switch to the awake state at the time of receiving the beacon (S409).

That is, the receiver 200 may switch to the sleep state and then switch to the awake state at the time of receiving the next beacon.

In this manner, when the data to be transmitted to the GTS allocated to the receiver 200, each of the receivers 200 enters the sleep state until the next beacon is received, and thus, there is an advantage of minimizing unnecessary standby power consumption while the data to be transmitted is not present.

Next, a method by which the transmitter 100 according to an embodiment of the present disclosure includes information indicating the presence or absence of transmission data in a beacon is described with reference to FIG. 12.

Figure 12:
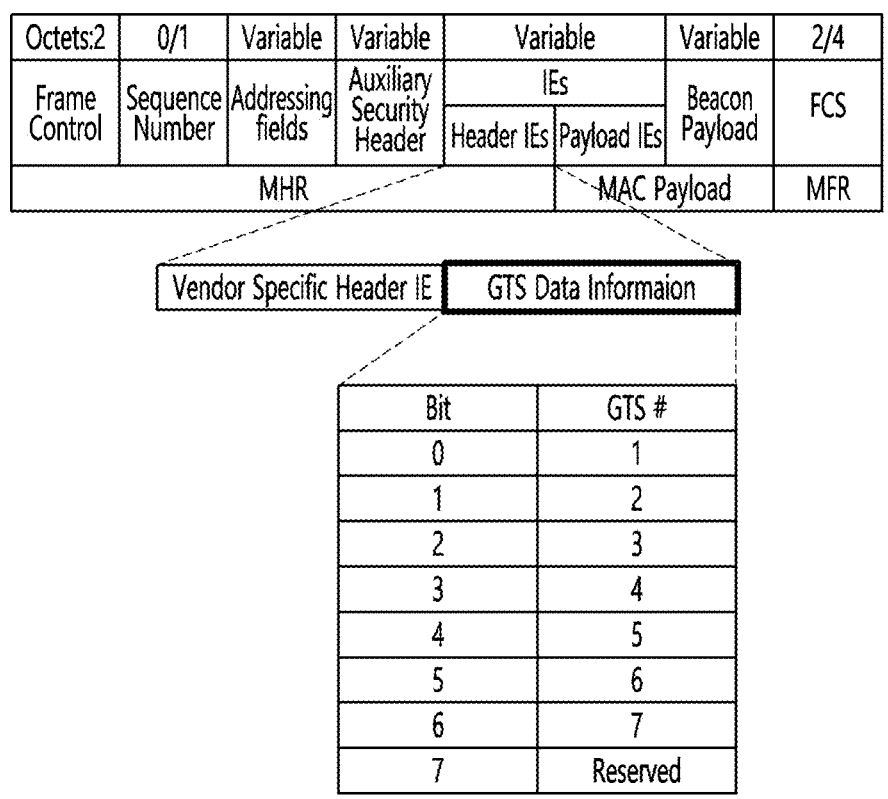
FIG. 12 is a drawing showing an example of a method by which a transmitter according to an embodiment of the present disclosure includes information indicating the presence or absence of transmission data in a beacon.

FIG. 12 is a drawing showing an example of a method by which the transmitter according to an embodiment of the present disclosure includes information indicating the presence or absence of transmission data in the beacon.

FIG. 12 may be the data format of the beacon transmitted by the transmitter according to an embodiment of the present disclosure. The transmitter 100 may include information indicating the presence or absence of transmission data in the header IEs of the beacon to be transmitted to the receiver 200. At this time, the header IEs may be defined by using vendor-specific header IE.

In the example of FIG. 12, the transmitter 100 may display information indicating the presence or absence of transmission data to each GTS in 0-6 bits. Specifically, the transmitter 100 may represent data information of GTS #1 with 0 bit, data information of GTS #2 with 1 bit, data information of GTS #3 with 2 bits, data information of GTS #4 with 3 bits, data information of GTS #5 with 4 bits, data information of GTS #6 with 5 bits, and data information of GTS #7 with 6 bits. The transmitter 100 may include 0 in a bit corresponding to a GTS in which the audio data to be transmitted is not present.

Meanwhile, FIG. 12 is only an example, and the transmitter 100 according to an embodiment of the present disclosure may include information indicating the presence or absence of data to be transmitted to each GTS in various ways.

The beacons and the audio data transmitted and received between the transmitter 100 and the receiver 200 may be captured by air sniffing equipment. It may be confirmed that the header IEs of the beacon or audio data captured in this way include data existence information of the GTS or the beacon sequence number as described above.

The present disclosure described above may be embodied as computer-readable code on a medium on which a program is recorded. A computer-readable medium includes any types of recording devices in which data readable by a computer system is stored. Examples of the computer-readable medium include hard disk drive (HDD), solid state disk (SSD), silicon disk drive (SDD), ROM, RAM, CD-ROM, magnetic tape, floppy disk, optical data storage device, and the like. Accordingly, the above detailed description should not be construed as restrictive in all aspects and should be considered as illustrative. The scope of the present specification should be determined by reasonable interpretation of the appended claims, and all modifications within the equivalent scope of the present specification fall within the scope of the present specification.

The above description is merely illustrative of the technical spirit of the present invention, and various modifications and changes can be made by those of ordinary skill in the art, without departing from the scope of the present invention.

Therefore, the embodiments disclosed in the present invention are not intended to limit the technical spirit of the present invention, but are intended to explain the technical spirit of the present invention. The scope of the technical spirit of the present invention is not limited by these embodiments.

The scope of the present invention should be interpreted by the appended claims, and all technical ideas within the scope equivalent thereto should be construed as falling within the scope of the present invention.

The invention claimed is:

1. A transmitter comprising:
   a communicator configured to transmit audio data to a receiver via ultra-wide band (UWB); and
   a controller configured to, when receiving a guaranteed timeslot (GTS) request from the receiver, allocate a GTS of the receiver according to channel information of the receiver and transmit the audio data to the allocated GTS.

2. The transmitter of claim 1, wherein, after allocating the GTS, the controller is configured to transmit, to the receiver, data transmission-related information including a number of data to be transmitted during a beacon interval section and an effective data transmission period.

3. The transmitter of claim 1, wherein the controller includes, in a header of the audio data, a beacon sequence number of a beacon interval section in which the audio data is transmitted.

4. The transmitter of claim 1, wherein the controller is configured to, when failing to transmit the audio data, determine whether the audio data whose transmission is failed has exceeded an effective transmission period, and cancel audio data transmission when the effective transmission period has exceeded.

5. A receiver comprising:
   a communicator configured to receive audio data from a transmitter via ultra-wide band (UWB); and
   a controller configured to request the transmitter to allocate a guaranteed timeslot (GTS) for receiving the audio data and receive the audio data through the allocated GTS.

6. The receiver of claim 5, wherein the controller is configured to reproduce audio data whose beacon sequence number is a value obtained by subtracting an effective data transmission period from a current beacon sequence number.

7. The receiver of claim 5, wherein the controller is configured to operate in an awake state or a sleep state depending on information indicating a presence or absence of transmission data included in a beacon header.

8. A radio audio system comprising:
   a transmitter configured to transmit audio data via ultra-wide band (UWB); and
   a receiver configured to receive the audio data from the transmitter,
   wherein the transmitter is configured to, when receiving a guaranteed timeslot (GTS) request from the receiver, allocate a GTS of the receiver according to channel information of the receiver and transmit the audio data to the allocated GTS.

9. The radio audio system of claim 8, wherein after allocating the GTS, the transmitter is configured to transmit, to the receiver, data transmission-related information including a number of data to be transmitted during a beacon interval section and an effective data transmission period.

10. The radio audio system of claim 8, wherein the transmitter includes, in a header of the audio data, a beacon sequence number of a beacon interval section in which the audio data is transmitted.

11. The radio audio system of claim 10, wherein the receiver is configured to reproduce audio data whose beacon sequence number is a value obtained by subtracting an effective data transmission period from a current beacon sequence number.

12. The radio audio system of claim 8, wherein the transmitter is configured to, when failing to transmit the audio data, determine whether the audio data whose transmission is failed has exceeded an effective transmission period, and cancel audio data transmission when the effective transmission period has exceeded.

13. The radio audio system of claim 8, wherein the transmitter includes information indicating a presence or absence of transmission data in a beacon header depending on a presence or absence of data to be transmitted to the GTS.

14. The radio audio system of claim 13, wherein the receiver is configured to operate in an awake state or a sleep state depending on the information indicating the presence or absence of transmission data included in the beacon header.

15. The radio audio system of claim 14, wherein the receiver is configured to switch to the awake state at a time of receiving a next beacon when the receiver is operating in the sleep state.

* * * * *